United States Patent [19]
Kremsler et al.

[11] Patent Number: 5,771,583
[45] Date of Patent: Jun. 30, 1998

[54] CUTTER BLADE SUPPORT FOR A HEDGE TRIMMER

[75] Inventors: Dieter Kremsler, Spiegelberg; Kirsten Schellin, Schorndorf; Wolfgang Weissert, Winnenden; Stephan Ostendorf, Weinstadt, all of Germany

[73] Assignee: Andreas Stihl, Waiblingen, Germany

[21] Appl. No.: 839,154

[22] Filed: Apr. 23, 1997

[30] Foreign Application Priority Data

Apr. 26, 1996 [DE] Germany ............... 296 07 614 U

[51] Int. Cl.⁶ .................................................. B26B 19/04
[52] U.S. Cl. ............................... 30/216; 30/223; 30/270
[58] Field of Search .................... 30/216, 223, 224, 30/225, 270

[56] References Cited

U.S. PATENT DOCUMENTS

| | | | |
|---|---|---|---|
| 886,197 | 4/1908 | Filetz | 30/270 |
| 3,798,768 | 3/1974 | Cowley et al. | 30/223 |
| 4,216,582 | 8/1980 | Paule et al. | 30/216 |
| 5,075,972 | 12/1991 | Huang | 30/216 |
| 5,153,996 | 10/1992 | Kuzarov et al. | 30/223 |

FOREIGN PATENT DOCUMENTS 4224665  1/1994  Germany.

*Primary Examiner*—Hwei-Siu Payer
*Attorney, Agent, or Firm*—Walter Ottesen

[57] ABSTRACT

The invention is directed to a cutter blade support for a pair of knives of a hedge trimmer. The cutter blade support includes first and second bars conjointly defining a space therebetween. First and second cutter blades are arranged in the space and define respective sets of apertures formed therein. The first bar has openings formed therein and a plurality of threaded bolts are held in the second bar. The threaded bolts extend through the respective sets of apertures and have respective end portions extending through the openings in the first bar. Attachment nuts are disposed on the first bar and threadably engage corresponding ones of the end portions. The threaded bolts are pressed into the second bar so as to be tightly held therein and so as to be nonrotatable with respect thereto.

12 Claims, 2 Drawing Sheets

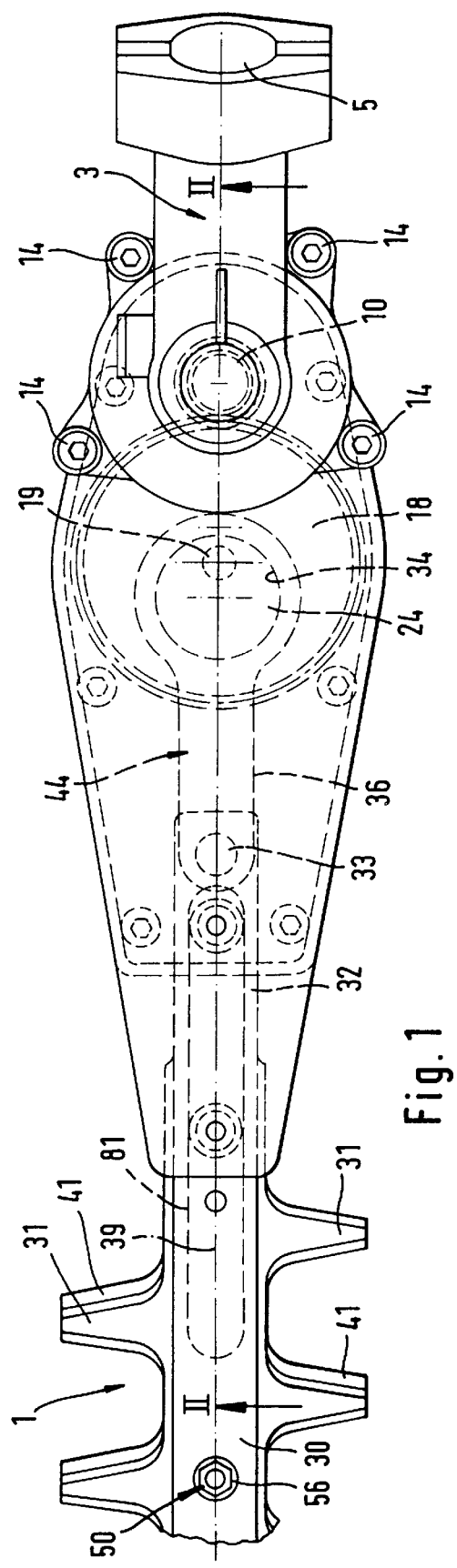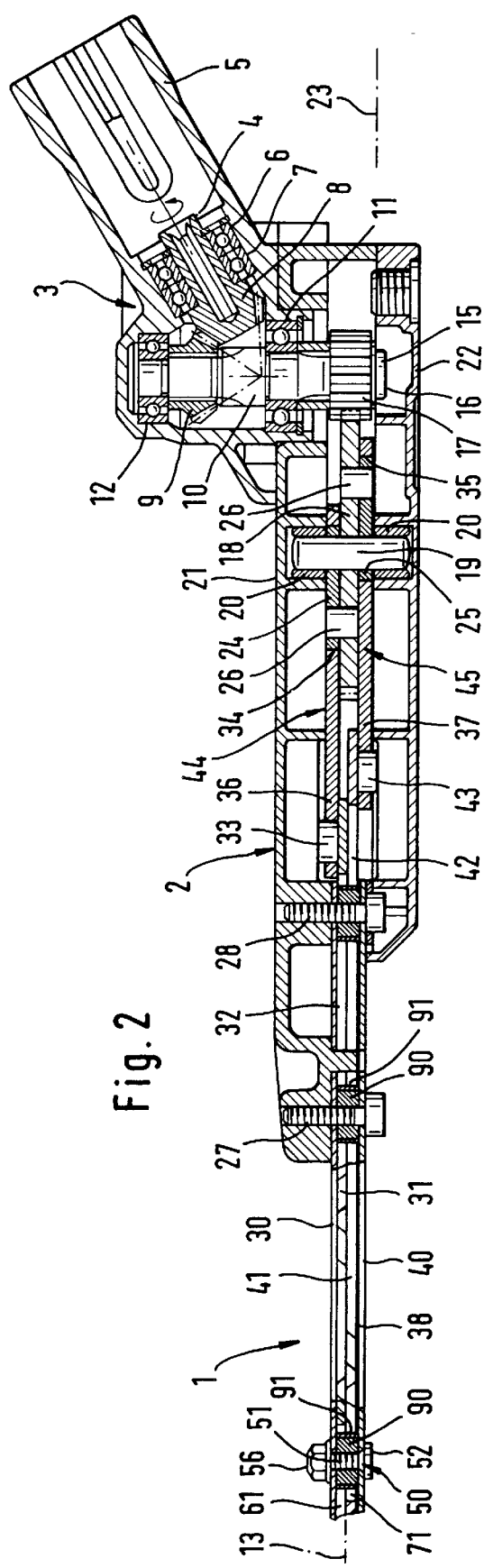
Fig.1
Fig.2

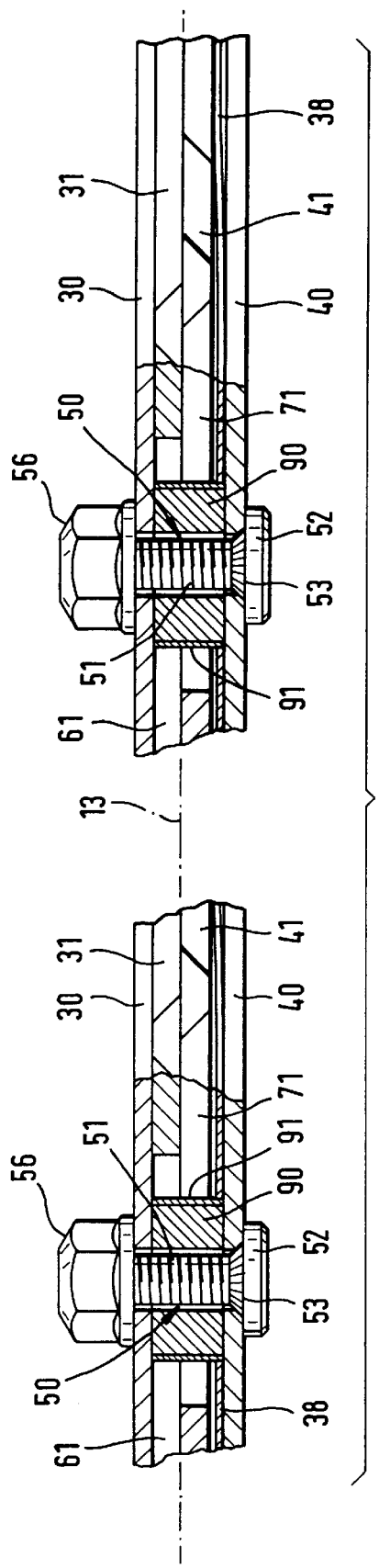
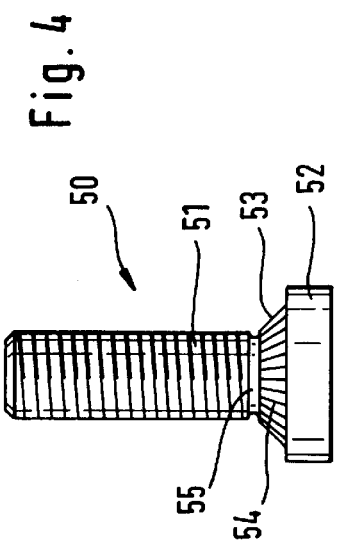
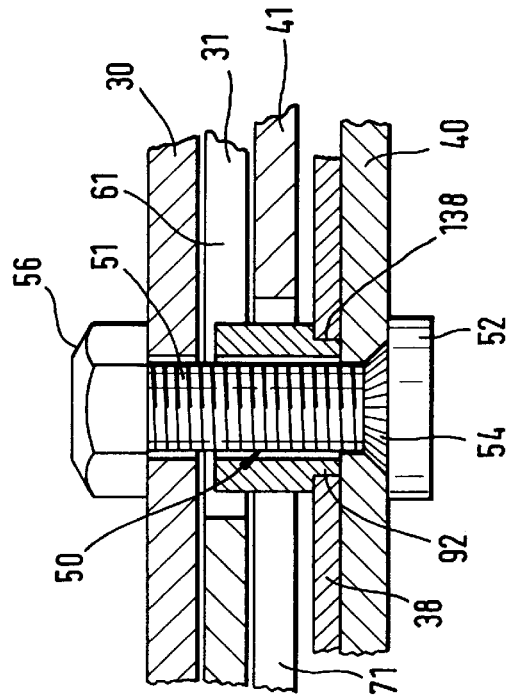

CUTTER BLADE SUPPORT FOR A HEDGE TRIMMER

BACKGROUND OF THE INVENTION

German published patent application 4,224,665 discloses a cutter blade support for a hedge trimmer wherein a knife pair is mounted between two bars. The bars are narrower than the cutter blades of the knife pair. The bars extend essentially in the mid-region of the cutter blades over their entire length. The bars and the cutter blades arranged between the bars are secured via threaded bolts. The head of each threaded bolt is held so as to be fixed against rotation in a bar configured with a hollow profile. In this way, the nuts, which are at the other end of the threaded bolts, can be easily loosened for disassembling the cutter blade support, for example, for sharpening the individual cutter blades. The threaded bolts are however not fixed in the longitudinal direction of the bars so that hole-locating work is associated with the assembly of the cutter blade support. The profile used is complex in manufacture and causes the cutter blade support to have a significant structural elevation which can have a negative effect on manipulability.

SUMMARY OF THE INVENTION

It is an object of the invention to provide a simple cutter blade support having a low structural elevation and which can be easily assembled and disassembled.

The cutter blade support of the invention is for a pair of knives of a hedge trimmer. The cutter blade support includes: first and second bars conjointly defining a space therebetween; first and second cutter blades arranged in the space and defining respective aperture means formed therein; the first bar having opening means formed therein; a plurality of threaded bolts held in the second bar; the threaded bolts extending through the aperture means and having respective end portions extending through the opening means; attachment nuts disposed on the first bar to threadably engaging corresponding ones of the end portions; and, the threaded bolts being pressed into the second bar so as to be tightly held therein and so as to be nonrotatable with respect thereto.

The threaded bolts are configured in the manner of drive-in bolts and are axially pressed into receiving holes of one of the bars. The threaded bolts are held pressed into the bar and are therefore fixed so that they cannot rotate relative to the bar and cannot become axially separated therefrom. The threaded bolts are preferably pressed into the lower bar and define with the bar a unitary component so that the assembly of a disassembled cutter blade support can be rapidly carried out without further alignment and hole-locating work.

Preferably, the material of the bar is plastically deformed so that the material of the bar surrounds the shank of the threaded bolt in a friction-tight manner while also surrounding the shank especially in a form-tight manner.

The threaded bolt has a knurled anchoring section between the head and the bolt shank in order to achieve a high reliability against the bolt being rotated out of its position in the bar. This knurled anchoring section is tightly engaged by the plastically deformed material of the bar. For this purpose, it can be advantageous that the threaded bolt be pressed into the material of the bar over a portion of its axial elevation. The threaded bolt preferably has a flat head.

Several threaded bolts are provided along the length of the bar and are preferably spaced equidistantly from each other.

BRIEF DESCRIPTION OF THE DRAWINGS

The invention will now be described with reference to the drawings wherein:

FIG. 1 is a plan view of a hedge-trimmer attachment for a portable handheld work apparatus;

FIG. 2 is a section view along line II—II of FIG. 1 and shows the hedge-trimmer attachment in section;

FIG. 3 is an enlarged schematic detail view of the connecting screws of the cutting blade support;

FIG. 4 is an enlarged schematic detail view of a threaded bolt before being pressed into the bar; and, FIG. 5 is an enlarged detail assembly view of the threaded bolt connection.

DESCRIPTION OF THE PREFERRED EMBODIMENTS OF THE INVENTION

The hedge-trimmer attachment shown in FIG. 1 comprises essentially a cutter blade support 1 which is fixed on a connecting housing 2. The connecting housing is attached to a gear housing 3 which has a gear assembly having an input shaft 4 for connecting to a drive shaft of a drive motor (not shown). The input shaft 4 is rotatably journalled in the lower end section of a connecting tube 5 by means of two bearings 6 and 7. The bearings 6 and 7 are preferably roller bearings each having inner and outer races. The hedge-trimmer assembly is preferably provided to operate with a brushcutter apparatus. The brushcutter apparatus has a guide tube surrounding the drive shaft. The guide tube has an end facing toward the work tool and can be inserted into the connecting tube 5.

The input shaft 4 has an end facing away from the connecting tube 5. At this end, the input shaft 4 is configured as one piece with a bevel gear 8 which meshes with a bevel gear 9 attached to a gear shaft 10 so as to rotate therewith. The gear shaft 10 is held at both sides of the bevel gear 9 in bearings 11 and 12. The bearings 11 and 12 are preferably roller bearings having an inner race and an outer race. The drive shaft 10 is perpendicular to a cutting plane 13 which is conjointly defined by cutter blades 31 and 41.

The drive shaft 10 projects into the connecting housing 2. The connecting housing essentially comprises an upper housing shell 21 and a lower housing shell 22. As shown in FIG. 1, the gear housing 3 is fixed by attachment screws 14 to the connecting housing 2, namely to the upper housing shell 21. The end 15 of the gear shaft 10 projects into the connecting housing 2 and passes through the housing partition plane 23. The gear shaft 10 is preferably supported in a receptacle 16 of the lower housing shell 22.

The end 15 of the gear shaft 10 supports a drive gear or pinion 17 at the elevation of the cutting plane 13 and the pinion 17 meshes with an eccentric gear 18 lying in the cutting plane 13. The eccentric gear 18 is rotatably journalled with an insert shaft 19 in the connecting housing 2. The insert shaft 19 has respective ends disposed in corresponding bushings 20. The bushings 20 are held in respective receptacles of the upper and lower housing shells 21 and 22. The insert shaft 19 lies parallel to the rotational axis of the gear shaft 10. The insert shaft 20 is perpendicular to the cutting plane 13 of the cutter blade support 1.

Eccentric discs (24 or 25) are arranged at each of the two axial end faces of the eccentric gear 18. The eccentric discs lie shifted in phase 180° with respect to each other. The insert shaft 19 extends through each of the eccentric discs and each of the eccentric discs is connected so as to rotate with the eccentric gear 18 via an insert bolt 26.

Each eccentric disc (24 or 25) lies in a connecting-rod eye (34 or 35) of a driving connecting rod (44 or 45). The shank (36 or 37) of each connecting rod (44 or 45) extends in the direction toward the cutter blade support 1 in the connecting housing 2. The cutter blade support 1 is fixed by means of two connecting screws 27 and 28 approximately in the partition plane 23 of the housing on the upper housing shell 21 of connecting housing 2. Preferably, the upper housing shell 21 projects beyond the lower housing shell 22 in the direction toward the cutter blade support 1. As shown in FIG. 1, the connecting housing lies so as to be aligned in the longitudinal direction of the cutter blade support 1. The connecting screw 28 is covered by the lower housing shell 22. The connecting screw 27 is exposed.

As shown in FIGS. 2 and 3, the cutter blade support 1 comprises two bars 30 and 40 and a pair of knives mounted therebetween. The pair of knives is defined by the cutter blades 31 and 41.

The cutter blade support 1 is held together by the threaded bolts 50. Several threaded bolts 50 are arranged in a row over the length of the cutter blade support and are preferably at equidistant spaces as shown in FIG. 3. The threaded bolts lie approximately on the longitudinal center axis 39 of the cutter blade support and extend through the bars 30 and 40 as well as the cutter blades 31 and 41 as shown in FIGS. 2 and 3.

In the embodiment shown, the bar 30 faces toward the upper housing half 21 of the connecting housing 2. The bar 30 can therefore also be referred to as the upper bar. Correspondingly, the bar 40 facing toward the lower housing shell 22 can be referred to as the lower bar. Correspondingly, the cutter blades can be referred to as the upper cutter blade 31 and the lower cutter blade 41.

In the embodiment shown, a corrugated flat spring 38 lies between the lower bar 40 and the lower cutting blade 41. The flat spring 38 is preferably made of hardened steel and functions as a slide assist. The flat spring 38 takes up the axial forces of the screw connections and ensures a firm sliding contact of the cutter blades (31, 41) on each other.

The ends 32 and 42 of the cutter blades 31 and 41 project beyond the ends of the bars 30 and 40 into the connecting housing 2 and are provided with respective crank pins 33 and 43 on the flat sides thereof facing away from each other. The crank pins 33 and 43 engage in a small connecting rod eye of the connecting rod shank 36 and 37, respectively, of the corresponding drive connecting rods 44 and 45.

The base bodies of the cutter blades 31 and 41 have longitudinal slots formed therein at the region of the connecting screws 27 and 28 as well as at the region of the threaded bolts 50. Respective longitudinal slots 61 and 71 are provided in the region of the threaded bolts 50; whereas, a longer longitudinal slot 81 is formed in the region of the connecting screws 27 and 28. Sleeves 90 are disposed in the longitudinal slots and connecting screws 27 and 28 and the shank 51 of the threaded bolt 50 extend through corresponding ones of the sleeves 90. The sleeves 90 define slide blocks and are preferably provided with a slide coating 91 over their periphery. It can be advantageous to fix the sleeves 90 on the flat spring 38 so that the sleeves 90, which are provided as slide blocks, can define a single component with the flat spring 38. This unitary component can then be handled as an assembly part. For this purpose, the sleeves 90 are provided with ends 92 having a reduced outer diameter as shown in FIG. 5 and the sleeves 90 engage with the ends 92 in respective bores 138 of the flat spring 38. Preferably, the sleeve ends 92 are pressed into the bores 138 and are thereby held therein so that they cannot become separated therefrom.

The axial forces generated by the screw connections are transmitted via the sleeve end faces to the bars (30, 40). It can be advantageous to support the forces at the annular shoulders via the corrugated flat spring. The annular shoulders are formed by diameter reduction.

The sleeves 90 simultaneously serve as spacer sleeves for the axial spacing between the bars 30 and 40.

The threaded bolts 50 connect the cutter blade support 1 and are held in the lower bar 40 so that they cannot rotate relative thereto. The threaded bolt 50 is pressed into the lower metal bar 40 so that the threaded bolt 50 together with the bar 40 conjointly define an inseparable unit after the threaded bolt 50 is pressed into the lower bar 40.

The threaded bolts are configured as so-called drive-in screws. As shown in FIG. 4, the threaded bolts essentially comprise a threaded shaft 51 having a flat head 52. An attachment section 53 is formed between the head 52 and the threaded shaft 51. This attachment section 53 is preferably provided with knurling 54 over the periphery thereof. The attachment section 53 is configured so as to have the shape of a truncated cone. It can be advantageous to provide a peripheral slot 55 of slight depth between the attachment section 53 and the threaded shaft 51.

The threaded bolt 50 is preferably configured as shown in FIG. 4 and is aligned perpendicularly to the receiving bar 40 and is preferably pressed into a prestamped receiving hole. The material of the bar 40 is advantageously plastically deformed and is in friction-tight contact with the attachment section 53. An approximately form-tight connection is achieved in the direction of rotation via the knurling 54. If a peripheral slot 55 is provided, the material of the bar enters into the peripheral slot 55 with the plastic deformation so that an axial form-tight connection of the threaded bolt 50 with the lower bar 40 is achieved.

The press-in depth of the threaded bolt can be so selected that the flat head 52 enters into the material of the bar 40 over a portion of its axial height.

The threaded bolt 50 has a length so that its free end projects beyond the bar 30 lying on the other side of the cutter blades (31, 41) and supports an attachment nut 56 with which the two bars 30 and 40 are threadably fastened tightly to each other. The spacer sleeve 90 then assumes the axial screw forces. Preferably, self-locking nuts are used as attachment nuts 56.

The threaded bolts 50 are held pressed into the one bar 40. Because of this configuration, these bolts remain in the bar 40 during disassembly of the cutter blade support 1. The threaded bolts 50 and the bar 40 conjointly define a single unit. The flat spring 38 equalizes the unevenness of the bar 40 holding the threaded bolts 50. This unevenness occurs on the side facing toward the cutter blade 41.

It is understood that the foregoing description is that of the preferred embodiments of the invention and that various changes and modifications may be made thereto without departing from the spirit and scope of the invention as defined in the appended claims.

What is claimed is:

1. A blade support in combination with cutter blades, the combination comprising:

first and second bars conjointly defining a space therebetween;

first and second cutter blades arranged in said space and defining respective aperture means formed therein;

said first bar having opening means formed therein;

a plurality of threaded bolts held in said second bar;

said threaded bolts extending through said aperture means and having respective end portions extending through said opening means;

attachment nuts disposed on said first bar to threadably engaging corresponding ones of said end portions; and, said threaded bolts being pressed into said second bar so as to be tightly held therein and so as to be nonrotatable with respect thereto.

2. The combination of claim 1, said threaded bolts being drive-in bolts.

3. The combination of claim 2, wherein each of said threaded bolts has a shank; and, the material of said second bar is plastically deformed so as to friction-tightly engage said shank and to surroundedly engage said shank in a form-tight manner.

4. The combination of claim 3, wherein each of said threaded bolts has a head and a fixing section disposed between said head and said shank.

5. The combination of claim 4, said fixing section defining a knurled surface.

6. The combination of claim 4, each of said threaded bolts having a peripheral slot formed therein between said fixing section and said shank.

7. The combination of claim 6, each of said threaded bolts defining a longitudinal axis; said head of said threaded bolt being a flat head which lies partially embedded in the material of said second bar over a portion of the elevation of said head measured in the direction of said longitudinal axis.

8. The combination of claim 7, said second bar being the lower bar of said cutter blade support whereby said lower bar faces toward the plant material to be cut by said hedge trimmer.

9. The combination of claim 8, wherein said plurality of threaded bolts is arranged at equal spacings along the length of said first and second bars.

10. The combination of claim 1, said second cutter blade being adjacent said second bar; and, said cutter blade support further comprising a flat spring interposed between said second cutter blade and said second bar.

11. The combination of claim 10, said flat spring being wavy or corrugated.

12. The combination of claim 10, further comprising a plurality of spacer sleeves fixed on said flat spring.

* * * * *